Patented June 16, 1936

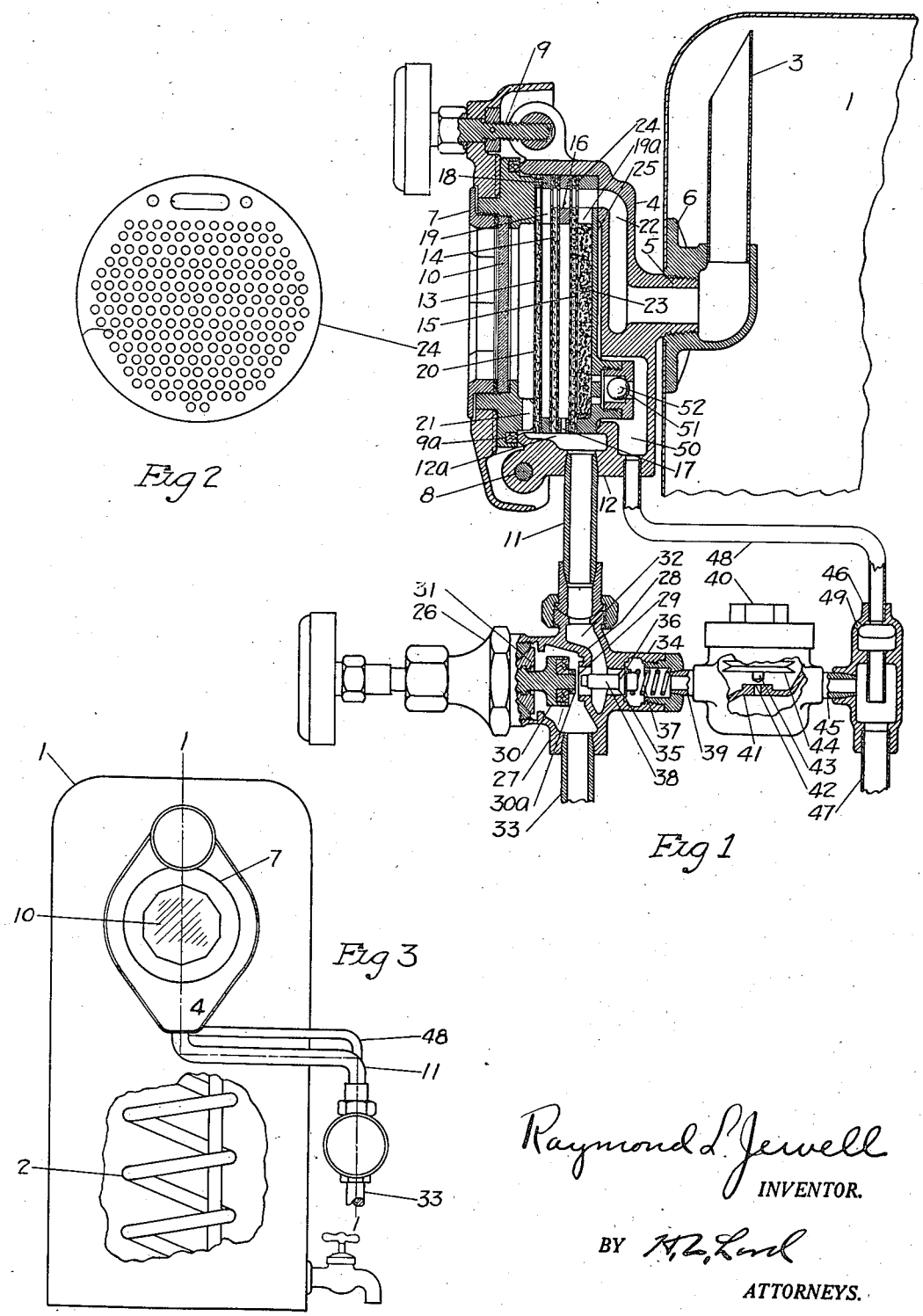

2,044,433

UNITED STATES PATENT OFFICE 2,044,433

WATER STERILIZER

Raymond L. Jewell, Millcreek Township, Erie County, Pa., assignor to American Sterilizer Company, Erie, Pa., a corporation of Pennsylvania

REISSUED

Application October 17, 1933, Serial No. 693,942

20 Claims. (Cl. 210—99)

It is necessary for many uses to sterilize water and also desirable with most of such uses to filter the water. It has been the practice to filter the water as it has been delivered to the sterilizing receptacle and then disconnect the filter from the receptacle so as to prevent later contamination of the water through leakage past the filter. These filters become very much contaminated in their use even where replaced within practical limits and there is always some menace incident to possible leakage from such filters to the receptacle.

The present invention is designed to obviate this condition and contemplates the automatic sterilizing of the filter as the water in the sterilizing receptacle is sterilized.

During the cooling or withdrawal of sterilized water it is necessary to permit the introduction of air to prevent the formation of a partial vacuum in the sterilizer chamber. Such vacuum, if permitted, would interfere with or entirely prevent the withdrawal of the water from the sterilizing receptacle. Unless otherwise guarded against, a partial vacuum formed due to withdrawal of water would be compensated for by air entering through the draw-off valve. This air would carry with it bacteria laden dust and would thus contaminate the sterilized water. It may be brought about in two ways, one, during the cooling of the sterilized water and consequent condensation of the steam above the water. The other cause tending to produce a vacuum arises from the withdrawal of the sterile water itself and the necessary compensation for the displacement. This requires that provision be made for the introduction of air during the entire operation of the sterilizer. The present invention contemplates the introduction of air through an air filter made sterile automatically with each heating of the sterilizing receptacle to sterilize the water. Features and details of the invention will appear from the specification and claims.

A preferred embodiment of the invention is illustrated in the accompanying drawing as follows:—

Fig. 1 is a section on the line 1—1 in Fig. 3.

Fig. 2 is an elevation of one of the filter unit supporting plates.

Fig. 3 shows a front elevation of the sterilizer.

1 marks the sterilizer receptacle, 2 a heating and cooling coil within the receptacle, 3 an inlet pipe for delivering water to the upper part of the receptacle, and 4 a filter case. The filter case has a discharge extension 5 screwed into a fitting 6. The inlet pipe 3 is secured in the fitting 6 and thus connected with the filter. A door 7 is hinged to the filter case at 8 and is provided with a screw 9 at its opposite side by which the door may be closed with seating pressure. A gasket 9a is arranged between the door and the filter case. The door is provided with a transparent plate 10 forming a window by means of which the condition of the filter may be observed.

Water is delivered to the filter case through a pipe 11 which is screwed into an inlet extension 12 on the case. Water filter units 13, 14 and 15 are arranged in the case. These units are secured between perforated plates. The opposing perforated plates of units 14 and 15 are carried by a spacer ring 16 having an opening 17 to the inlet passage 12a. Opposing plates on the units 13 and 14 are carried by a spacer ring 18. The spacer ring 18 has a discharge passage 19 at the top. A perforated plate 20 is provided at the front of the unit 13 and water is admitted to the space between the plate 20 and the front of the case by way of a passage 21 and to the space between units 14 and 15 by way of passage 17 leading from the inlet port 12a. Water is discharged from the passages 19 and 19a by way of a passage 22 to the discharged extension 5. The water filter plates may contain any suitable water filtering material, usually a cellulose pulp. The water, therefore, as it is admitted passes through the three units and is filtered thereby in the usual manner. An air filtering unit 23 has a perforated plate 24 over the water filter unit 15 and a rear plate 25. A filtering medium, preferably of metal wool is arranged between the perforated plate 24 and the plate 25. As water is admitted through the unit 15 it passes not only through the water filtering medium, but the air filter as well, thus wetting the air filter, the air filter material giving very little resistance to the flow of water. The several filter units and spacers are assembled and locked in place with the closing of the door and the different filtering units may be readily removed and replaced through the door opening. The water supply is provided with an admission valve 26. This is formed with a body 27 having a diaphragm 28 with the valve opening and surrounding seat 29. A valve head 30 operates on the seat and is controlled by a valve stem 31. The valve has a discharge passage 32 into the pipe 11 and a supply pipe 33 is connected with the inlet side of the valve. The valve body has an extension 34 with a valve opening therein and surrounding seat 35. A valve head 36 operates on the seat and is urged to closing position by a spring 37. The valve head 36 has a forward extension 38 which leads through the valve opening in the diaphragm 28 and is adapted to be engaged by a forward projection 30a on the head 30. The relation of the extension 38 and the projection 30 is such that when the valve head 30 is closed the valve head 36 is opened, and on the other hand, when the valve head 30 is opened, the valve head 36 is closed through the action of the spring.

The extension 34 is connected by a nipple 39 with a thermally actuated valve 40. This thermally actuated valve has the usual diaphragm 41 with a valve opening 42 controlled by a valve head head 43 and the valve head is actuated by a thermal element 44. The valve 40 is connected by a nipple 45 with a drain fitting 46 which fitting leads to a sewer connection 47.

In the operation of the sterilizer, the control valve is opened, admitting water through the filter by way of the passages above described and the inlet 3. After the admission of the water the admission valve is closed and this opens the drain valve having the head 36. The water in the sterilizer is then brought to sterilizing temperature by means of the coil 2 and as the steam forms in the sterilizer it passes down the inlet pipe 3 and through the filter plates by way of the pipe 11 and through the open drain valve to the thermal valve and this in response to the action of the steam closes. Steam then builds up in the sterilizer to sterilizing temperature and is held on the filter plates during this operation. As soon as the steam is cut off the coil 2 and the steam pressure is reduced the thermal valve finally cools and opens. This affords an air passage back through the water filter plates to the sterilizer receptacle, but the water filter plates are so dense that in practice no air passes through these filter plates to the sterilizer, the air admission provided satisfying this condition.

In order to filter the air and permit its ready admission where the pressure is reduced in the sterilizer receptacle a pipe 48 leads from the upper part of the fitting 46. Air vents 49 are provided for the ready admission of air to the upper part of the fitting. Drainage, however, is provided from the pipe 48 to the fitting and thence to the sewer connection 47. The pipe 48 leads to a chamber 50 in the case. The chamber 50 is connected by a passage 51, controlled by a check valve 52, with the air filter 23 and with any reduction of pressure in the receptacle the check valve 52 opens and permits air to pass into the air filter up through the air filtering material to the passage 19a and thence to the receptacle to compensate for any vacuum producing conditions.

It will be noted that the air filter is subjected to the sterilizing action of steam sterilizing the water in the same manner as the water filter plates and on the other hand there is sufficient condensate, or moisture left in the air filter to assure a retention of any dust that may be carried with the air.

It will be seen, therefore, that with this structure the apparatus as a whole, so far as the sterilizing of the filters and providing against possible contamination through leakage, is automatic. The operator simply opens the admission valve, fills the sterilizer, closes the admission valve and subjects the sterilizer to the usual sterilizing temperature. The drainage of the filter is accomplished with the closing of the admission valve through the opening of the drainage valve. Should there be leakage of any consequence from the admission valve this unsterile water would pass through the drainage connection and operating upon the thermally actuated valve would cool it and open it so as to provide an ample escape for the water. After the sterilizer is cooled and the thermal valve is normally opened any leakage from the admission valve has a direct outlet to the sewer connection. With each operation, therefore, all the filters are thoroughly sterilized. The air filter is fully wetted by steam, or condensation, so that with any indrawing of air any contaminating dust is retained in the filter.

What I claim as new is:—

1. In a sterilizer, the combination of a receptacle; heating means for heating water in the receptacle to steam-forming temperature; a water filter; a drain for the filter; means supplying water to the receptacle through the filter and sterilizing steam to the filter from the receptacle upon discharge of water from the filter; and means controlling the drain to discharge the water from the filter and close the drain against the discharge of steam.

2. In a sterilizer, the combination of a receptacle; a heating means for heating the water to a steam-forming temperature; an air filter; means supplying air to the receptacle through the filter and applying sterilizing steam to the filter from the receptacle; and devices closing the filter against the discharge of steam when filled from the receptacle.

3. In a water sterilizer, the combination of a receptacle; a heating means heating water therein to a steam-forming temperature; a water filter; an air filter; means supplying water and air to the receptacle through said filters and applying steam to said filters from the receptacle; and means closing said filters against a discharge of steam when filled from the receptacle.

4. In a water sterilizer, the combination of a receptacle; heating devices heating water therein to a steam-forming temperature; an air filter; means supplying air through the filter to the receptacle and supplying sterilizing steam to the filter from the receptacle; and a thermal valve controlling said means to introduce air during the discharge of the receptacle and closing said means to trap steam in the filter as steam is led to it from the receptacle.

5. In a water sterilizer, the combination of a receptacle; heating devices for heating water therein to a steam-forming temperature; a water filter; means controlling the flow of water through the filter to the receptacle and steam from the steam space of the receptacle to the filter comprising a manually operated admission valve controlling the water; and an automatic means controlling the filter to discharge the water from the filter upon the closing of the controlling valve and to admit to and retain in the filter steam produced in the receptacle.

6. In a water sterilizer, the combination of a receptacle; heating devices heating water in said receptacle to a steam-forming temperature; a water filter; an air filter; means controlling a flow of water and air through the filters to the receptacle and a discharge of water from the filter and providing for the admission of steam from the steam space of the receptacle to the filters; and an automatic means controlling the filters to hold in the filters steam produced in the receptacle upon the discharge of water from the filter.

7. In a water sterilizer, the combination of a water receptacle; means for heating water therein to steam forming temperature; a water filter;

means between the filter and the receptacle discharging water from the filter to the receptacle and providing for a flow of steam to the filter from the steam space of the receptacle; a water conduit leading to the filter; an admission valve for closing the conduit; a drain discharging the water from the filter to permit an inflow of steam from the steam space of the receptacle to the filter, and means for closing the drain against the escape of steam.

8. In a water sterilizer, the combination of a water receptacle; means for heating the water therein to steam-forming temperature; a water supply inlet leading to the receptacle; a water filter discharging to the inlet; a water conduit leading to the filter; an admission valve in the conduit; devices operating the admission valve; a drain discharging the filter; and means closing the drain responsive to the action of said devices.

9. In a water sterilizer, the combination of a water receptacle; means for heating the water therein to steam-forming temperature; a water supply inlet leading to the inlet; a water filter discharging to the inlet; a water conduit leading to the filter; an admission valve in the conduit; a drain discharging the filter and permitting an inflow of steam from the receptacle; and thermally actuated means closing the drain.

10. In a water sterilizer, the combination of a water receptacle; means for heating the water therein to steam-forming temperature; a water filter comprising removable filter plates; means between the filter and the receptacle discharging water from the filter to the receptacle and providing for a flow of steam from the steam space of the receptacle to the filter; a water conduit leading to the filter, an admission valve for closing the conduit; a drain discharging the water from the filter to permit an inflow of steam from the steam space of the receptacle to the filter; and means for closing the drain against the escape of steam.

11. In a water sterilizer, the combination of a water receptacle; means for heating water therein to steam forming temperature; a water filter, said filter comprising a case, a plurality of filter plates in the case with spaces formed between said plates, said case having discharge passages discharging and communicating with some of the spaces, and spaces on the opposite sides of the filter plates communicating to an inlet passage in the filter case; means between the filter discharge passages and receptacle discharging water from the filter to the receptacle and providing for a flow of steam from the steam space of the receptacle to the filter; a water conduit leading to the inlet passage in the filter; an admission valve for closing the conduit; a drain for discharging the filter and permitting an inflow of steam from the steam space of the receptacle to the filter; and means for closing the drain against the escape of steam.

12. In a water sterilizer, the combination of a water receptacle; means for heating the water therein to steam-forming temperature; a water supply inlet leading to the receptacle; a water filter discharging to the inlet, said filter comprising a case having a discharge passage leading to the inlet and inlet passages leading to the case; a water filter plate in the case receiving water from the inlet passage at one side and discharging to the discharge passage; an air filter in the case discharging to the discharge passage in the case; an air inlet passage to the air filter; means for preventing a return flow from the air filter; a water conduit leading to the inlet passage in the case; an admission valve in the conduit; a drain discharging the filter; and means closing the drain.

13. In a water sterilizer, the combination of a water receptacle; means for heating the water therein to steam-forming temperature; a water supply inlet leading to the receptacle; a water filter discharging to the inlet, said filter comprising a case having a discharge passage leading to the inlet and inlet passages leading to the case; a water filter plate in the case receiving water from the inlet passage at one side and discharging to the discharge passage; an air filter in the case discharging to the discharge passage in the case, said air filter having its medium wetted through the action of water and steam in the case; an air inlet passage to the air filter; means for preventing a return flow from the air filter; a water conduit leading to the inlet passage in the case; an admission valve in the conduit; a drain discharging the filter; and means closing the drain.

14. In a water sterilizer, the combination of a water receptacle; means for heating the water therein to steam-forming temperature; a water supply inlet leading to the receptacle; a water filter discharging to the inlet, said filter comprising a case having a discharge passage leading to the inlet and inlet passages leading to the case; a water filter plate in the case receiving water from the inlet passage at one side and discharging to the discharge passage; an air filter in the case discharging to the discharge passage in the case, said filter comprising a chamber bounded on one side by a water filter plate and containing a filter material; an air inlet leading to the filter remote from the discharge passage; means for preventing a return flow from the air filter; a water conduit leading to the inlet passage in the case; an admission valve in the conduit; a drain discharging the filter; and means closing the drain.

15. In a water sterilizer, the combination of a water receptacle; means for heating the water therein to steam-forming temperature; a water supply inlet leading to the receptacle, a water filter discharging to the inlet, said filter comprising a case having a discharge passage leading to the inlet and inlet passages leading to the case; a water filter plate in the case receiving water from the inlet passage at one side and discharging to the discharge passage; an air filter in the case discharging to the discharge passage in the case, said filter comprising a chamber bounded on one side by a water filter plate and containing metal wool as a filter material; an air inlet leading to the filter remote from the discharge passage; means for preventing a return flow from the air filter; a water conduit leading to the inlet passage in the case; an admission valve in the conduit; a drain discharging the filter; and means closing the drain.

16. In a water sterilizer, the combination of a water receptacle; means for heating the water therein to steam-forming temperature; a water supply inlet leading to the receptacle; a water filter discharging to the inlet, said filter comprising a case having a discharge passage leading to the inlet and inlet passages leading to the case; a water filter plate in the case receiving water from the inlet passage at one side and discharging to the discharge passage; an air filter in the case discharging to the discharge passage in the case; an air inlet passage to the air filter; means for preventing a return flow from the air filter; a water conduit leading to the inlet passage in the case; an admission valve in the conduit; a drain discharging the filter; means closing the drain; and a connection leading from the non-return means to the drain.

17. In a water sterilizer, the combination of a water receptacle; means heating the water therein to steam-forming temperature; a water supply inlet leading to the receptacle; a water filter discharging to the inlet, said filter comprising a case having a discharge passage leading to the supply inlet and an inlet passage leading to the case; water filter plates receiving water from the inlet passage at one side of the plates and discharging to the discharge passage from the opposite sides of the plates; a door on the case through which the plates may be removed; an air filter comprising a chamber bounded at one side by a water filter plate, said chamber discharging to the discharge passage and having an inlet passage with a non-return valve; filter material arranged in the chamber; a water conduit leading to the inlet passage in the case; an admission valve in the conduit; a drain discharging the filter and permitting an inflow of steam from the receptacle; means closing the drain actuated with the admission valve; thermally actuated means controlling the drain; and a connection between the non-return valve from the air filter to the drain.

18. In a water filter, the combination of a receptacle; heating devices heating water therein to a steaming temperature; an air filter; means supplying air through the filter to the receptacle and supplying moisture to the filter through steam delivered to the filter from the receptacle; and a valve mechanism controlling said means for the introduction of air and preventing an unobstructed outflow of steam from the receptacle.

19. In a water filter, the combination of a receptacle; heating devices heating water therein to a steaming temperature; an air filter; means supplying air through the filter to the receptacle and supplying moisture to the filter through steam delivered to the filter from the receptacle; and a thermal valve controlling said means for the introduction of air and preventing an unobstructed outflow of steam from the receptacle.

20. In a water filter, the combination of a receptacle; heating devices heating water therein to a steam-forming temperature; an air filter; means supplying air through the filter to the receptacle and supplying sterilizing steam to the filter from the receptacle; and a valve mechanism controlling said means for the introduction of air and for closing said means to trap steam in the filter.

RAYMOND L. JEWELL.